July 28, 1959 W. H. LYON 2,897,290

AUTOMATIC TRACKING DEVICE FOR TRANSVERSE SOUND TRACK TAPE RECORDERS

Filed Dec. 14, 1956 2 Sheets-Sheet 1

INVENTOR.
WILLIAM H. LYON
BY
H. G. Manning
ATTORNEY

July 28, 1959 W. H. LYON 2,897,290

AUTOMATIC TRACKING DEVICE FOR TRANSVERSE SOUND TRACK TAPE RECORDERS

Filed Dec. 14, 1956 2 Sheets-Sheet 2

INVENTOR.
WILLIAM H. LYON
BY
H. G. Manning
ATTORNEY 2,897,290

AUTOMATIC TRACKING DEVICE FOR TRANSVERSE SOUND TRACK TAPE RECORDERS

William H. Lyon, Orange, Conn., assignor to The Soundscriber Corporation, New Haven, Conn., a corporation of Connecticut Application December 14, 1956, Serial No. 628,417

13 Claims. (Cl. 179—100.2)

Figure 1:
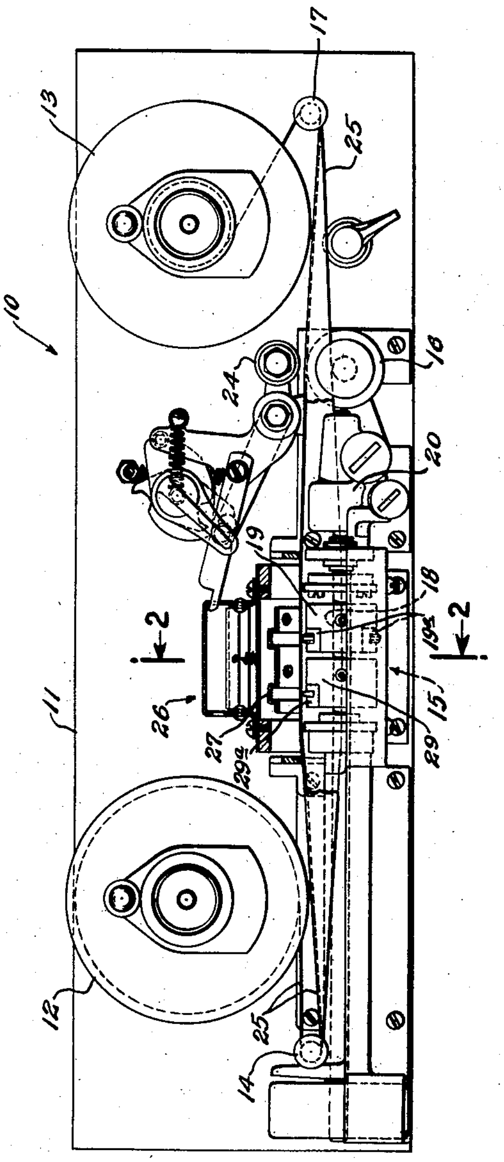

This invention relates to a long-playing sound reproducing apparatus of the type wherein a series of successive sound tracks are impressed transversely across a wide, longitudinally-moving magnetic record tape.

In my co-pending application, Serial No. 406,517, filed January 27, 1954, entitled "Transverse Interrupted Track Magnetic Recorder With Transducer Head Drum on Horizontal Axis," there is disclosed a long-playing sound recording and reproducing apparatus wherein successive sound tracks are impressed transversely across a wide magnetic tape as it passes over a revolving drum having a plurality of recording/reproducing magnetic heads spaced about its periphery. Mechanism is provided for pressing the tape arcuately into engagement with the cylindrical surface of the drum, so that as the drum rotates in synchronism with the movement of the magnetic tape, a series of substantially linear and parallel closely spaced sound tracks will be generated across said tape.

During the reproduction of such a recorded tape, it is difficult to maintain synchronism for a long period of time, without occasional manual adjustment, especially when playing back lengthy recordings. This is for the reason that temperature and humidity variations which occur between the recording and playback, affect the length of the tape, either slightly shrinking or lengthening it.

The principal object of this invention is to provide automatic tracking means operative during playback, accurately to synchronize the forward motion of the tape with the scanning speed of the reproducing magnetic heads, so that faithful reproduction without cross-talk can be achieved, and avoiding the necessity of manual adjustment.

Another object of this invention is to provide a tracking device of the character described, employing a sensing head wheel, located in spaced relation from the transducer head wheel, so as to lie between successive record tracks during synchronous tracking, and to provide an electrical impulse for automatically restoring the tape to said synchronized position whenever the head wheel falls out of proper synchronism and engages an adjacent sound track.

Another object of the invention is to provide an automatic magnetic tape track synchronizing device of the above nature which will be simple in construction, inexpensive to manufacture, and efficient and durable in use.

Figure 6:
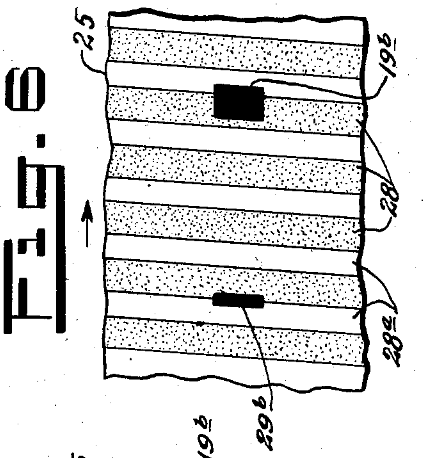
Figure 5:
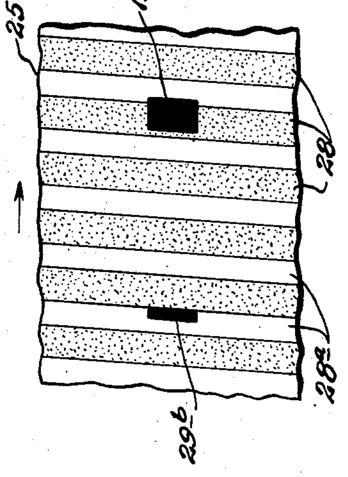
Figure 4:
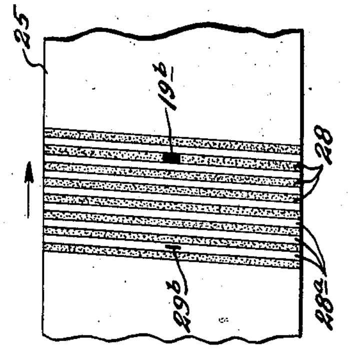
Figures 2, 3:
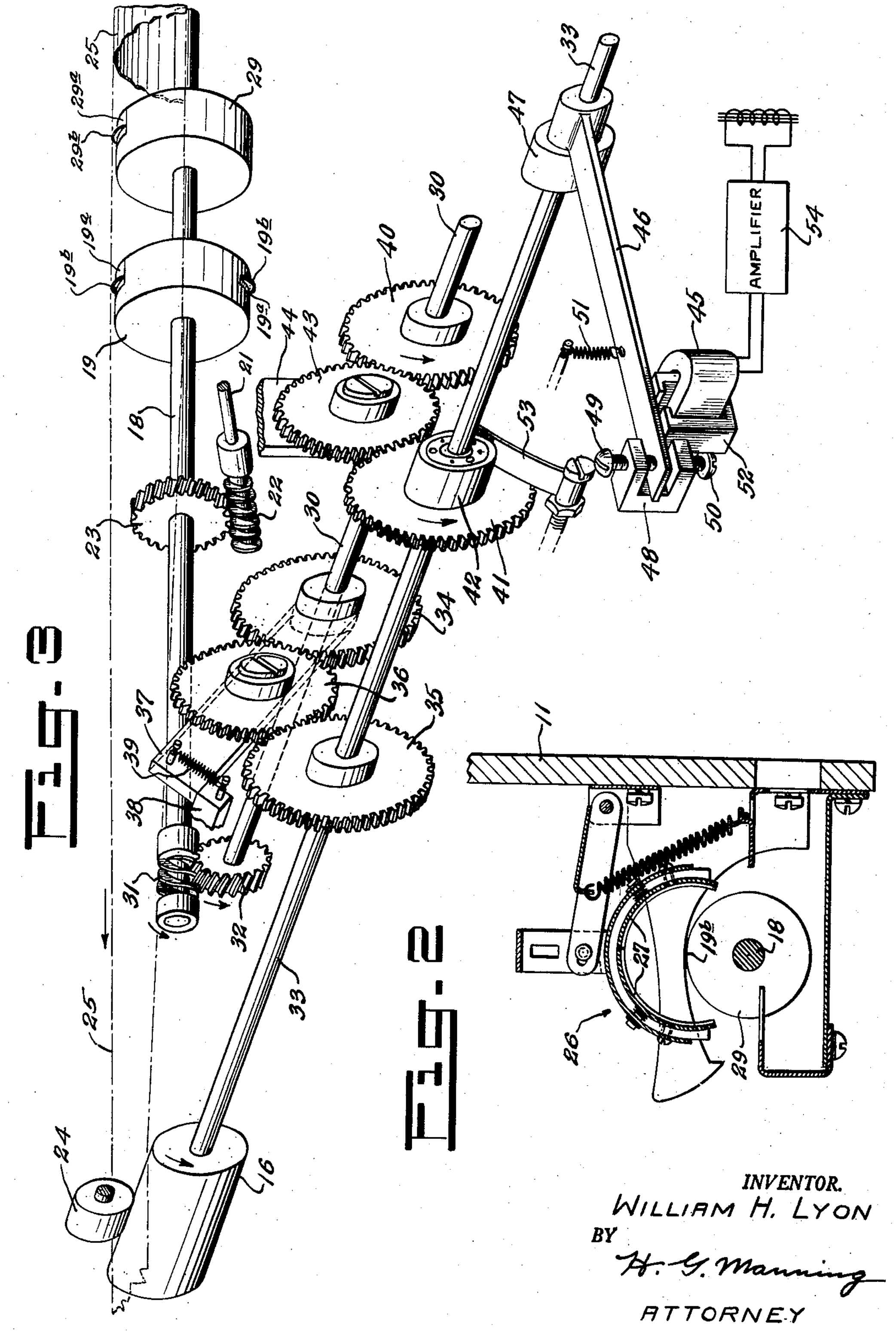

Other objects, features and advantages of the invention will be apparent from the following description when considered with reference to the appended drawings. In the drawings, which illustrate one form in which the invention may conveniently be embodied in practice:

Fig. 1 is a front elevational view of a long-playing recorder/reproducer device embodying the invention, Fig. 2 is a vertical cross-section, taken along the line 2—2 of Fig. 1, Fig. 3 is a schematic perspective view of the automatic tracking mechanism forming part of the recorder/reproducer shown in Fig. 1, Fig. 4 illustrates a fragmentary view of a magnetic tape, showing the relative positions of the reproducing head and the sensing head under conditions of proper tracking, Fig. 5 illustrates a fragmentary portion of the tape, on an enlarged scale, showing the sensing head as it starts to engage the adjacent recorded sound track when the reproducing head wheel passes out of synchronism with the sound tracks, and Fig. 6 illustrates a similar fragmentary portion of the tape, showing the sensing head in further engagement with the sound track, and in position to generate a corrective impulse to restore the tape to true synchronized position.

Referring now to the drawings, wherein like reference numerals denote corresponding parts throughout the several views, the numeral 10 designates generally a long-time magnetic tape recorder/reproducer apparatus embodying the present invention.

Since the construction and operation of the recorder/reproducer device 10, exclusive of the automatic tracking mechanism hereinbelow described which comprises the present invention, is fully described in applicant's above-mentioned co-pending application Serial No. 406,517, only so much thereof will be described herein as is deemed necessary to fully disclose the present invention.

The recorder/reproducer 10 comprises a support panel 11, upon which is rotatably mounted a tape feed reel 12, and a tape take-up reel 13. An elongated magnetic record tape 25 is fed from the feed reel 12 over a guide roller 14, through a recording and reproducing mechanism, generally indicated by the the reference numeral 15, over a tape drive roller 16, and around a guide roller 17 to the take-up reel 13.

The recording and reproducing mechanism 15 comprises a horizontally journalled elongated axle 18 carrying a playback drum 19, having a plurality (two in the present example) of transducer heads 19*a* on the periphery thereof (see Fig. 3), each of said heads having a pole piece 19*b*.

A motor driven gear box 20 (Fig. 1) contains a shaft 21 (see Fig. 3) which drives the drum axle 18 through a worm 22 and a pinion 23. The axle 18 is also adapted, through gearing and control mechanism hereinbelow described, to simultaneously rotate the tape drive roller 16.

A small tape drive friction wheel 24 is movable against the top of the tape 25 to press it against the drive roller 16 for the purpose of moving the tape 25 across the recording and reproducing mechanism 15 in synchronism with the rotation of the playback drum 19.

Provision is also made of a vertically retractable shoe mechanism 26 having two substantially semicircular overlapping parallel pressure plates 27, 27 operative to resiliently press the tape 25 into concave configuration about the upper half of the record/playback drum 19 as the tape moves longitudinally and said drum rotates.

Mechanism is also shown in Fig. 1 for permitting the withdrawal of the friction roller 24 from the tape 25 when the shoe mechanism 26 is in retracted position as illustrated, for facilitating removal and rethreading of the record tape.

The dimensions of the transducer drum 19, and the number of transducer heads 19*a* are so chosen that when the apparatus is in operation, one head 19*a* will just begin its sweep across the tape 25 when the next previous head 19*a* is leaving the tape, so that parallel spaced sound tracks 28 will be successively traced across the tape by the pole pieces 19*b* to continuously record thereon, leaving spaces 28*a* between each two adjacent tracks.

In accordance with the present invention, a sensing drum 29 is also arranged on the axle 18, in spaced relation to the drum 19, said sensing drum being provided in its periphery with a single magnetic sensing head **29*a*. The pole piece 29*b* of the sensing head 29*a* is substantially narrower than the pole pieces 19*b* of the transducer heads 19*a*, and the spacing between the sensing drum and the transducer head drum 19 is such that when the heads 19*a* are in proper synchronized alignment with the recorded tracks 28 being reproduced during playback, the sensing head pole piece 19*b* will lie centrally between a pair of successive record tracks 28, in a space 28*a* (see Fig. 4). By means of this construction, it will be seen that if the tracks 28 being reproduced should begin to fall out of synchronism with the transducer head pole pieces 19*b*, as indicated in Fig. 5 (and to a greater degree in Fig. 6), an electrical impulse will be induced in the sensing head pole piece 29*b*, which is utilized, in the manner now to be described, for appropriately advancing the tape 25 until the tracks 28 again come into synchronism with the pole pieces 19*b***.

As illustrated in Fig. 3, a tape feed drive shaft 30 is driven from the axle 18, through a worm 31 and a worm gear 32. Arranged parallel with the feed drive shaft 30, is a shaft 33 upon which the tape drive roller 16 is also mounted.

Two sets of gears 34, 35, 36, and 40, 41, 43 interconnect the tape feed drive shaft 30 and the tape roller drive shaft 33, each set comprising a driving gear, an idler gear, and a driven gear, respectively.

The idler gear 36 is journaled in the arm 37 which is pivotally supported at one end by the tape feed drive shaft 30, while its other end is disposed in abutment with a stop member 38, and resiliently held there against by an interconnecting tension spring 39, when the device is set for recording. In this position of the idler gear arm 37 (as illustrated in Fig. 3), the idler gear 36 intermeshes with the gears 34 and 35 so that there will be cooperative motion between the drum drive axle 18 and the drive roller shaft 33.

During reproduction (or playback), the idler gear 36 will be automatically removed from intermeshing engagement with the gear 35 by the swinging of the arm 37 clockwise an appropriate distance away from the stop member 38, and will remain in such position until the machine is again set for recording operation. During reproduction, the second set of gears 40, 41, 43 will come into play through a zero backlash roller-bearing slip clutch 42, and the idler gear 43 journalled on a fixed support arm 44 will always be in mesh with the gears 40 and 41.

The ratio of the gears 34 and 35 of the first set, is such that the roller drive shaft 33 is driven a fraction of a percent faster than it would be driven by the ratio of the gears 40 and 41 of the second set. Thus, during recording, when the idler gear 36 is engaged by both of the gears 34 and 35, the drive roller shaft 33 will turn slightly faster than the gear 41, this overdrive being permitted by the slip clutch 42, without overloading the gear system.

During reproduction, the idler gear 36 will be raised out of engagement with the driven gear 35, and the drive roller shaft 33 will be driven by the gear 40 through the idler gear 43 and the gear 41, at which time the zero backlash slip clutch 42 will firmly grip the drive roller shaft 33 and provide a firm, non-slipping drive.

Because of the above-described differences in gear ratio, during reproduction, the tape 25 will be fed through the mechanism by the feed roller 16 at a fraction of a percent slower speed than that used during recording. For this reason, the tracks 28 on the tape 25 will always drift out of alignment with the playback head pole pieces **19*b*, in the direction of the arrow in Fig. 5, and as soon as the sensing head pole piece 29*b*, which has been riding in the intermediate blank spaces 28*a*, "brushes" against the edge of a recorded track 28, a voltage impulse will be generated in said sensing head pole piece 29*b*. This impulse will be amplified in a relay amplifier 54 (Fig. 3) connected to an energizing coil 45 of an electromagnet 52** for the purpose hereinbelow described.

A synchronization control arm 46 (Fig. 3) is connected at one end to the drive roller shaft 33 through a second zero backlash roller-bearing slip clutch 47. The other end of the arm 46 extends within a fixed U-shaped stop bracket member 48, and is movable between a pair of upper and lower stop screws 49 and 50 carried by said member 48, said arm 46 being normally held upwardly in abutment with the upper stop screw 49 by a tension coiled spring 51.

The electromagnet coil 45 is spaced below the control arm 46 near the outer end thereof, so that when it becomes electrically energized by virtue of an impulse generated in the sensing head **29*a*, the electromagnet 52 will pull the arm 46 downwardly from its normal resting place against the upper stop screw 49 and against the lower stop screw 50. The clutch 47 will thus instantly grip the drive roller shaft 33 and rotate it rapidly forwardly by an amount determined by the spacing between the stop screws 49 and 50**.

Since the rate of travel of the arm 46 is considerably faster than the normal speed of the shaft 33, the gear 41 will be overdriven, this being permitted by the slip clutch 42.

In order to avoid this overdriven action from being taken up in the backlash of the gears 40, 41 and 43, a thin resilient brake strip 53 is provided for pressing against the housing of the slip clutch 42 so to place a drag on the gear 41, thus preventing it from moving forward more rapidly than the normal driving speed.

*Operation*

The entire synchronizing action effected by the movement of the clutch arm 46 occurs within the slip clutch 42, and results in a slight variation in the angular relation between the shaft 33 and the gear 41. This causes the tape 25 to be accelerated for an instant in a forward direction, and realigns the reproducing pole pieces **19*b* with the tracks 28. At the same time, the sensing head pole pieces 29*b* will be brought into the non-recorded blank spaces 28*a*, so that no voltage will be induced in said sensing head. This cycle of operation will be repeated as long as necessary to maintain suitable registration or synchronism between the transducer head drum 19 and the recorded tracks 28**.

Since only a single sensing head **29*a* is used on the drum 29, only one voltage impulse can be generated during each rotation of the drum axle 18. It will be understood that the length of said impulse will depend upon the time the sensing head pole piece 19*b* is in contact with the tape 25. When the sensing head pole piece is not in contact with the tape, the clutch control arm 46 will be allowed to reset itself against the upper stop screw 49 under the action of the spring 51**.

Thus, if more than one cycle of operation is required to compensate for tape misalignment, the control arm 46 will reset itself once during every rotation of the head wheel axle 18.

While there has been disclosed in this specification one form in which the invention may be embodied in practice, it is to be understood that this form is shown for the purpose of illustration only, and that the invention is not to be limited to the specific disclosure, but may be modified and embodied in various other equivalent forms without departing from its spirit. In short, the invention includes all the modifications and embodiments coming within the scope of the following claims.

Having thus fully described the invention, what is claimed as new and for which it is desired to secure Letters Patent is:

1. An automatic tracking device for reproducing intelligence recorded along spaced parallel tracks impressed transversely across a wide magnetic tape, comprising, in combination, drive means, means controlled by said drive means for longitudinally moving said tape, pick-up means, means controlled by said drive means for moving said pick-up means across said tape at a speed slightly different from the tracking disposition with respect to one of said record tracks for reproducing the intelligence recorded therealong, sensing means spaced with respect to said pick-up means, said sensing means being disposed between two of said recorded tracks, and means controlled by electrical impulses induced in said sensing means when it engages one of said tracks by virtue of said pick-up means moving at said speed slightly different from the tracking disposition, for restoring said tape into synchronism with said pick-up means.

2. An automatic tracking device for reproducing intelligence recorded along spaced parallel tracks impressed transversely across a wide magnetic tape sound recording medium, comprising in combination, drive means, mechanism controlled by said drive means for longitudinally moving the record tape, a reproducer drum, a plurality of pick-up heads spaced about the periphery of said drum, means controlled by said drive means for rotating said drum, means for pressing said tape arcuately about the periphery of said drum so that said pick-up heads normally contact successive recorded sound tracks as said tape moves and said drum rotates, said drive means comprising mechanism for moving said tape at a speed slightly different from the tracking disposition of said pick-up heads with respect to said tracks, a sensing head mounted on said drum axially spaced from said pick-up head drum by such an amount as to contact said tape in the space between a pair of adjacent sound tracks when one of said pick-up heads is in contact with a track on said tape, and means controlled by said sensing head coming into contact with a track on said tape when one of said reproducer heads passes out of alignment with the tracks on said tape, for momentarily moving said tape independently with respect to said drum for again effecting tracking contact between said one of said reproducer heads and the tracks on said tape.

3. The invention as defined in claim 2, wherein said reproducer heads and said sensing head are each electromagnetic transducers.

4. The invention as defined in claim 2, wherein the axial spacing of said sensing head drum is in the direction opposite to the movement of said tape.

5. The invention as defined in claim 2, wherein said drive means comprises a drive shaft, and wherein said momentary tape moving means comprises an overdrive mechanism connected with said drive shaft, and means controlled by electrical impulses induced in said sensing head for actuating said overdrive mechanism.

6. The invention as defined in claim 5, wherein said overdrive mechanism comprises a roller clutch arranged on said drive shaft and a clutch actuating arm radially extending from said clutch and operative to rotate said drive shaft when turned in one direction.

7. The invention as defined in claim 5, wherein said overdrive actuating means comprises means for amplifying electrical impulses induced in said sensing head, and an electromagnet controlled by the output of said amplifying means.

8. The invention as defined in claim 5, wherein said overdrive mechanism comprises a roller clutch arranged on said drive shaft, a clutch actuating arm radially extending from said clutch and operative to rotate said drive shaft when turned in one direction, and wherein said overdrive actuating means comprises means for amplifying signals induced in said sensing head, and an electromagnet energized by the output of said amplifying means and operative when energized to turn said clutch actuating arm in said one direction by a predetermined amount.

9. The invention as defined in claim 8, including adjustable means for limiting the movement of said clutch actuating arm.

10. The invention as defined in claim 8, including resilient means normally holding said clutch actuating arm in one direction.

11. The invention as defined in claim 8, wherein said overdrive mechanism further comprises a second roller clutch on said drive shaft, and said tape drive mechanism including gear means for driving said second roller clutch.

12. The invention as defined in claim 11, including resilient brake means abutting said second clutch for preventing backlash in said tape drive mechanism.

13. The invention as defined in claim 11, including selectively operable means for moving said tape during playback at a slower speed than during the recording operation to cause slippage of said second roller clutch.

References Cited in the file of this patent

UNITED STATES PATENTS 2,809,238 Fay ------------------ Oct. 8, 1957